Nov. 24, 1970  P. G. J. FRACHOT  3,541,671

PROCESS OF FIXING PAPER TO METAL

Filed May 1, 1968

Inventor
PIERRE G. J. FRACHOT

By
Attorney 3,541,671
PROCESS OF FIXING PAPER TO METAL
Pierre G. J. Frachot, St. Berthevin, France, assignor to International Standard Electric Corporation, New York, N.Y., a corporation of Delaware
Filed May 1, 1968, Ser. No. 725,675
Claims priority, application France, June 9, 1967, 109,794
Int. Cl. B23k 31/02
U.S. Cl. 29—471.9       8 Claims

ABSTRACT OF THE DISCLOSURE

This is a method of fixing paper to a metal foil, such as an aluminum, by exerting pressure on the paper metal layers with a tool that utilizes ultrasonic vibrations.

BACKGROUND OF THE INVENTION

The present invention relates to a process for allowing paper to be fixed to metal.

Amongst known processess for fixing paper to metal, certain of them call upon mechanical pressure means, and others on physical-chemical means such as glues.

At the same time, it is known that certain metals can be soldered or fixed to one another by means of ultrasonic vibration tools pressed against them. In this case, the vibrations and the pressure have the effect of melting the metal locally and of joining the opposite faces.

On the other hand, these same means are known to operate the soldering of plastic materials to one another.

SUMMARY OF THE INVENTION

The object of the present invention relates to a process which allows for fixing an aluminum foil to one or more sheets of thin paper, not metallized on their faces.

According to a characteristic of the invention, it is provided that the paper and the metal are fixed together by means of ultrasonic vibration tools exercising at the same time a certain pressure.

The paper is preferably of the type known under the name of "blotting paper" or of "Kraft paper," like those used in the manufacture of electrolytic capacitors.

The total thickness of one or more layers of papers to be fixed can be comprised, for example, between 20 and 150 microns.

The metal to be fixed to the paper can be either pure aluminum or an alloy of aluminum and can be covered by a layer of oxide of several tenths of a micron in thickness.

The process of ultrasonic fixing described is distinguished from an ultrasonic soldering between two metals or between two plastic materials by the fact that the two facing materials are not of the same chemical nature, the first being metallic and the second being an organic composition.

BRIEF DESCRIPTION OF THE DRAWINGS

The invention will further be described with reference to the accompanying drawings in which.

DESCRIPTION OF THE PREFERRED EMBODIMENTS

Figure 1:
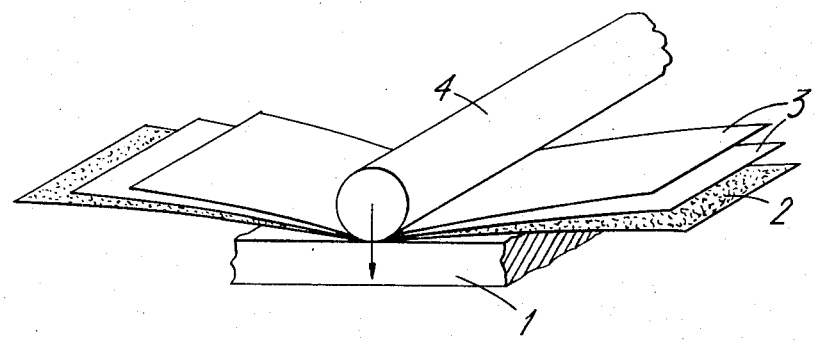
FIG. 1 shows a block of aluminum, a stack of foils of aluminum and paper and an ultrasonic vibration tool.

FIG. 1 shows a base 1 of pure non-oxidized aluminum; an aluminum foil 2, the thickness of which is between 15 and 100 microns and which is covered on both sides by a layer of oxide obtained, for example by anodization attaining between 0 and 1.5 microns in thickness; two sheets 3 of paper, of "blotting" type, each of about 50 microns thick; an ultrasonic tool 4 in the form of a cylindrical rod, the frequency of vibration of which is 20 kilocycles per second, this tool exerting a pressure of the order of 8 kgs./cm.$^2$ on the said layers.

The joint action during several seconds of the ultrasonic vibrations and of the pressure has the effect of fixing the two sheets of paper 3 and the sheet 2 of oxidized aluminum to the aluminum base 1.

It is to be noted that under the influence of the ultrasonic vibrations and of the pressure, the aluminum has pierced in places the layer of paper and imprisoned the fibers.

The quality of theis connection is excellent, even through one or more layers of paper, especially when the total thickness does not exceed about 150 microns. It is impossible to separate the assembled faces of paper and aluminum, nor the different layers of paper among themselves without tearing them.

Figure 2:
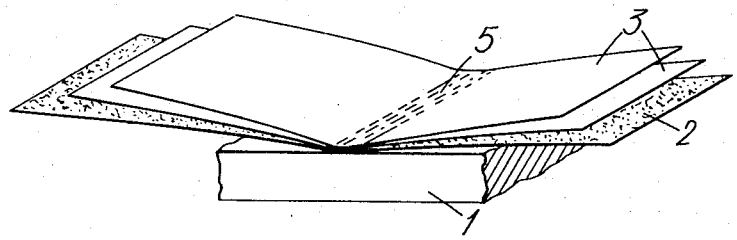
FIG. 2 shows the assembly of foils fixed to the aluminum block.

In FIG. 2, the traces 5 of aluminum which have come through the surface of the upper layer of paper may be remarked, these traces present a slight spreading out in the direction of the length following a small crushing of the materials facing one another under the pressure of the ultrasonic tool.

While I have described the above principles of my invention in connection with specific embodiments, it is to be clearly understood that the description is made by way of example only and not as a limitation to the scope of my invention as set forth in the accompanying claims.

I claim:
1. A process of fixing paper to a metal comprising: stacking said paper and metal;
applying pressure to said stack; and
ultrasonically vibrating said stack simultaneously with said applied pressure so as to fix said paper and metal to each other.
2. A process according to claim 1 wherein said metal is aluminum.
3. A process according to claim 1 wherein said metal is aluminum with oxidized surface.
4. A process according to claim 1 wherein said paper is in the form of several sheets.
5. A process according to claim 1 wherein said paper is a blotting type.
6. A process according to claim 1 wherein said ultrasonic vibration is applied with a cylinderical rod at a frequency of 20 kilocycles.
7. A process according to claim 1 wherein said stack is placed on a metal base and upon the application of said pressure and ultrasonic vibrations, said stack becomes fixed to said metal base.
8. A process according to claim 7 wherein said base is a block of aluminum.

References Cited

UNITED STATES PATENTS

| | | | |
|---|---|---|---|
| 2,480,501 | 8/1949 | Moore | 156—73 XR |
| 3,171,415 | 3/1965 | Williamson et al. | 156—73 XR |
| 3,222,235 | 12/1965 | Buchner | 156—73 |
| 3,296,990 | 1/1967 | Simjian | 156—73 XR |
| 3,436,005 | 4/1969 | Van Der Burgt | 228—1 |
| 3,438,428 | 4/1969 | Balamuth et al. | 228—1 XR |
| 3,461,542 | 8/1969 | Schoenthaler | 29—470.1 |

JOHN F. CAMPBELL, Primary Examiner

R. B. LAZARUS, Assistant Examiner

U.S. Cl. X.R.

29—472.3, 472.5, 472.9; 156—73